United States Patent
Pollet et al.

(10) Patent No.: US 12,094,722 B2
(45) Date of Patent: Sep. 17, 2024

(54) METHOD FOR INCREASING THE SURFACE ROUGHNESS OF A METAL LAYER

(71) Applicant: COMMISSARIAT À L'ÉNERGIE ATOMIQUE ET AUX ÉNERGIES ALTERNATIVES, Paris (FR)

(72) Inventors: Olivier Pollet, Grenoble (FR); Laurent Grenouillet, Grenoble (FR); Nicolas Posseme, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 472 days.

(21) Appl. No.: 17/535,777

(22) Filed: Nov. 26, 2021

(65) Prior Publication Data
US 2022/0172959 A1    Jun. 2, 2022

(51) Int. Cl.
| | | |
|---|---|---|
| H01L 21/3213 | (2006.01) | |
| H01L 21/02 | (2006.01) | |
| H01L 21/311 | (2006.01) | |
| H01L 21/3205 | (2006.01) | |

(52) U.S. Cl.
CPC .... *H01L 21/32136* (2013.01); *H01L 21/0254* (2013.01); *H01L 21/31116* (2013.01); *H01L 21/32051* (2013.01)

(58) Field of Classification Search
None
See application file for complete search history.

(56) References Cited

U.S. PATENT DOCUMENTS

| | | | |
|---|---|---|---|
| 4,642,163 A | 2/1987 | Greschner et al. | |
| 2001/0050390 A1* | 12/2001 | Kawai | H01L 28/84 257/E21.018 |
| 2015/0236136 A1 | 8/2015 | Chiu et al. | |

FOREIGN PATENT DOCUMENTS

| | | |
|---|---|---|
| FR | 3 000 602 A1 | 7/2014 |
| WO | WO 00/49651 A1 | 8/2000 |
| WO | WO 2015/186064 A1 | 12/2015 |
| WO | WO 2016/062613 A1 | 4/2016 |

OTHER PUBLICATIONS

Search Report as issued in French Patent Application No. 2012280, dated Aug. 19, 2021.
Charpin-Nicolle, C., et al., "Impact of roughness of TiN bottom electrode on the forming voltage of HfO_2 based resistive memories," Microelectronic Engineering, (2020), vol. 221, 6 pages.
Search Report as issued in European Patent Application No. 21210675.1, dated Apr. 19, 2022.

* cited by examiner

*Primary Examiner* — Feifei Yeung Lopez
(74) *Attorney, Agent, or Firm* — Pillsbury Winthrop Shaw Pittman LLP (57) ABSTRACT

A method for increasing the surface roughness of a metal layer, includes depositing on the metal layer a sacrificial layer made of a dielectric material including nitrogen; exposing a surface of the sacrificial layer to an etching plasma so as to create asperities; and etching the metal layer through the sacrificial layer, so as to transfer the asperities of the sacrificial layer into a part at least of the metal layer.

16 Claims, 3 Drawing Sheets

METHOD FOR INCREASING THE SURFACE ROUGHNESS OF A METAL LAYER

CROSS-REFERENCE TO RELATED APPLICATIONS

This application claims priority to French Patent Application No. 2012280, filed Nov. 27, 2020, the entire content of which is incorporated herein by reference in its entirety.

FIELD

The present invention relates to a method for increasing the surface roughness of a metal layer and the application thereof during the manufacture of a resistive random access memory cell or during the formation of a via between two metal lines.

BACKGROUND

In a metal-insulator-metal (MIM) type electronic device such as a capacitor or a resistive random access memory cell, the surface roughness of the metal layers forming the electrodes may have a significant impact on the electrical properties of the device.

For example, in an oxide-based resistive random access memory (OxRAM) cell comprising a lower electrode, an upper electrode and an active material of variable electrical resistance arranged between the electrodes, the roughness of the lower electrode has an influence on the so-called forming voltage of the memory cell. The forming voltage of an OxRAM cell is the voltage value at which the memory cell switches from a virgin state, characterised by a very high resistance (so-called initial resistance), to a low resistance state. The forming voltage is greater than the nominal forming voltage of the memory cell, which makes it possible to erase or to write the memory cell (passage from the low resistance state to a high resistance state, or vice versa).

In the article ["Impact of roughness of TiN bottom electrode on the forming voltage of $HfO_2$ based resistive memories", Microelectronic Engineering, 2020, vol. 221, p. 111194], C. Charpin-Nicolle et al. show that increasing the roughness of the lower electrode made of titanium nitride (TiN) has the effect of decreasing the forming voltage of the memory cell. A lower forming voltage is advantageous, because it makes it possible to reduce the size of the memory circuit (selection transistors, voltage generator circuit) and to improve the endurance of memory cells.

The lower TiN electrode is made rougher by exposure to a reactive ion etching (RIE) plasma. Different plasma chemistries each associated with particular etching conditions have made it possible to vary the surface roughness in root mean square value from 0.4 nm to 14 nm.

The increase in roughness by RIE necessitates however developing a specific recipe for each electrode material, while playing on numerous method parameters (mixture of reactive gases and concentrations, pressure, RF power, temperature, etc.). However, for certain metals, it proves to be impossible to generate roughness by RIE, no set of parameters making it possible to activate a random and non-uniform etching mechanism. Finally, other metals cannot be etched by RIE (because they do not produce volatile sub-species), but only by ion beam etching (IBE). Yet, by nature ion beam etching is not a technique making it possible to increase roughness.

SUMMARY

There thus exists a need to provide a method for increasing the surface roughness of a metal layer, which is applicable to all metals.

According to a first aspect of the invention, this need tends to be satisfied by providing a so-called "roughening" method comprising the following steps:
- depositing on the metal layer a sacrificial layer made of a dielectric material comprising nitrogen;
- exposing a surface of the sacrificial layer to an etching plasma so as to create asperities;
- etching the metal layer through the sacrificial layer, so as to transfer the asperities of the sacrificial layer into a part at least of the metal layer.

This roughening method makes it possible to increase the roughness of a metal layer, whatever the material that constitutes it, without having need to develop a plasma etching recipe specific to each metal, because the roughness is generated in the sacrificial layer made of dielectric material. It is applicable to all metals, because all the techniques for etching a metal (IBE, RIE, etc.) may be used to transfer the asperities of the sacrificial layer into the metal layer. In particular, the roughening method according to the invention is applicable to noble metals and alloys thereof (which can only be etched by ion beam), unlike the roughening method of the prior art.

The dielectric material comprising nitrogen may be selected from among silicon nitrides ($Si_xN_y$), silicon carbonitride (SiCN) and silicon boron carbonitride (SiBCN).

In an embodiment, the etching plasma is formed from a mixture of reactive gases comprising a gas containing oxygen, a gas containing silicon and fluorine or silicon and chlorine and a fluorocarbon gas ($C_xF_y$), optionally hydrogenated ($C_xH_yF_z$).

For example, the gas containing oxygen is $O_2$, the gas containing silicon and fluorine or silicon and chlorine is $SiCl_4$ or $SiF_4$ and the hydrogenated fluorocarbon gas is $CH_3F$.

In a particular embodiment of the roughening method, the dielectric material is a silicon nitride ($Si_xN_y$) and the etching plasma is generated in a chamber of a reactive ion etching reactor in the following conditions:
- a flow rate of $SiCl_4$ or $SiF_4$ entering into the chamber of the reactor comprised between 2 sccm and 5 sccm;
- a flow rate of $O_2$ entering into the chamber of the reactor comprised between 40 sccm and 250 sccm;
- a flow rate of $CH_3F$ entering into the chamber of the reactor comprised between 40 sccm and 250 sccm;
- a power emitted by a source of the reactor comprised between 100 W and 1000 W;
- a bias voltage comprised between −200 V and −500 V;
- a pressure in the chamber of the reactor comprised between 6.666 Pa and 19.998 Pa;
- a temperature of substrate holder comprised between 20° C. and 100° C.; and
- a temperature of the walls of the chamber of the reactor comprised between 50° C. and 80° C.

The roughening method may further comprise, after the step of etching of the metal layer, a step of selective removal of the sacrificial layer. Alternatively, the sacrificial layer may be entirely consumed during the step of etching of the metal layer.

The method according to the first aspect of the invention may also have one or more of the characteristics below, considered individually or according to all technically possible combinations thereof:

the sacrificial layer has after the step of exposure to the etching plasma a surface roughness, expressed in root mean square value, greater than or equal to 10 nm, and, in an embodiment, comprised between 10 nm and 30 nm;

the metal layer initially has a surface roughness, expressed in root mean square value, strictly less than 1 nm;

the metal layer is etched by means of an etching method having a selectivity with respect to the sacrificial layer comprised between 1 and 2 or strictly greater than 2.

A second aspect of the invention relates to a method for manufacturing a resistive random access memory cell comprising a first electrode, a second electrode and a resistive layer arranged between the first and second electrodes, the method comprising the following steps:

depositing a first metal layer on a substrate;

increasing the roughness of the first metal layer by means of a method according to the first aspect of the invention;

depositing a layer of material with variable electrical resistance on the first metal layer and a second metal layer on the layer of material with variable electrical resistance;

etching the first metal layer, the layer of material with variable electrical resistance and the second metal layer, so as to delimit respectively the first electrode, the resistive layer and the second electrode of the resistive random access memory cell.

A third aspect of the invention relates to a method for forming a via extending up to a metal barrier layer, the method comprising the following steps:

depositing a first dielectric layer on the metal barrier layer, the first dielectric layer being comprised of a material comprising nitrogen;

depositing a second dielectric layer on the first dielectric layer;

forming in the second dielectric layer a cavity leading into the first dielectric layer;

exposing at the bottom of the cavity a surface of the first dielectric layer to an etching plasma so as to create asperities;

etching the metal barrier layer through the first dielectric layer, so as to transfer the asperities of the first dielectric layer into a part at least of the metal barrier layer; and filling the cavity with at least one metal.

A fourth aspect of the invention relates to a method for increasing the surface roughness of a dielectric layer made of a silicon nitride ($Si_xN_y$), the method comprising a step of exposure of the sacrificial layer to an etching plasma, the etching plasma being formed from a mixture of reactive gases comprising a gas containing oxygen, a gas containing silicon and fluorine or silicon and chlorine and a fluorocarbon gas ($C_xF_y$), optionally hydrogenated ($C_xH_yF_z$).

BRIEF DESCRIPTION OF THE FIGURES

Other characteristics and benefits of the invention will become clear from the description that is given thereof below, for indicative purposes and in no way limiting, with reference to the following figures.

For greater clarity, identical or similar elements are marked by identical reference signs in all of the figures.

DETAILED DESCRIPTION

Figure 1A:
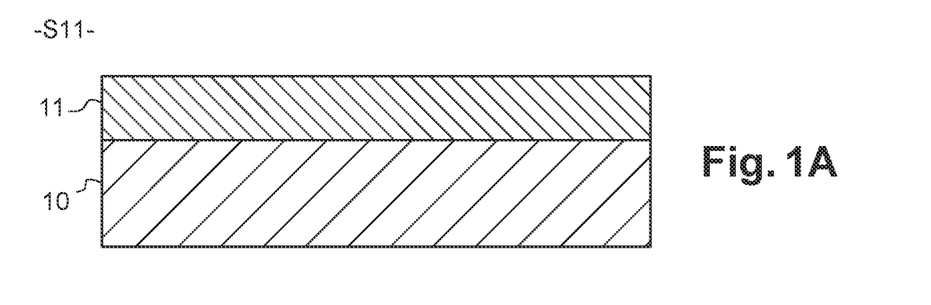
FIG. 1A, FIG. 1B, FIG. 1C and FIG. 1D represent the steps of a method for increasing the surface roughness of a metal layer.
Figure 1B:
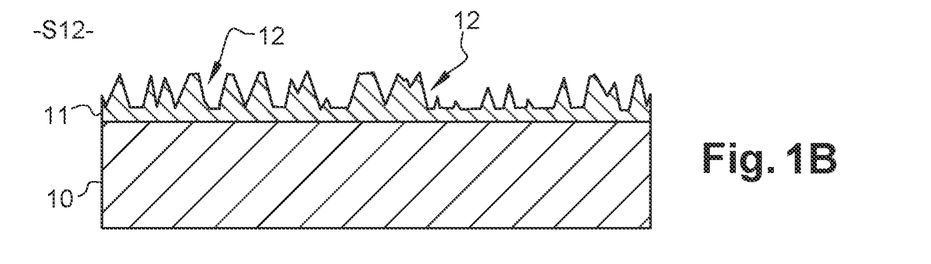
Figure 1C:
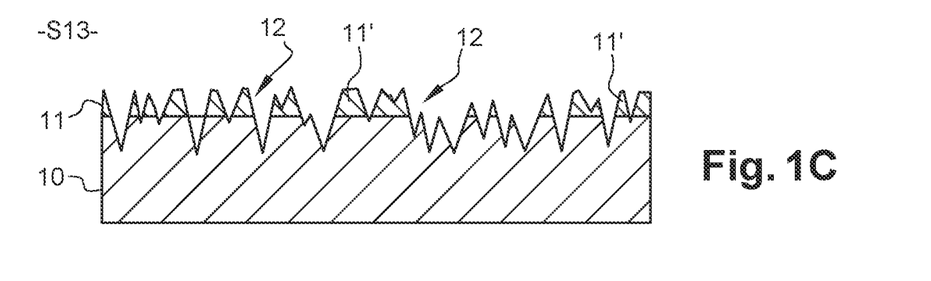

FIGS. 1A to 1C schematically represent steps S11 to S13 of a method for increasing the roughness of a metal layer 10. Metal layer is taken to mean a layer formed of a material of which the atoms are bound by metal bonds. This material (a metal) may be a simple body, such as titanium (Ti), tantalum (Ta), platinum (Pt), gold (Au) or ruthenium (Ru);

an alloy of several metal elements, for example an aluminium copper alloy (AlCu);

an alloy of a metal element with a non-metal element, such as a metal silicide (e.g. AlSi), a metal nitride (e.g. TiN, TaN) or a metal carbide The metal layer 10 may be arranged on a substrate (not represented), for example made of silicon. It is for example formed by physical vapour deposition (PVD).

Its thickness is desirably greater than or equal to 100 nm.

The metal layer 10 initially has (i.e. immediately after its deposition) a surface roughness strictly less than 1 nm. This roughness value, as well as all those given hereafter, are expressed in root mean square value. The root mean square roughness (noted Rq) is determined by a statistical analysis of an atomic force microscopy image, taking as sample a surface of 5×5 µm².

With reference to FIG. 1A, the method for increasing roughness, also called roughening method, comprises a first step S11 of deposition of a sacrificial layer 11 on the metal layer 10. The sacrificial layer 11, also called transfer layer or hard mask layer, is formed of a dielectric material comprising nitrogen. In an embodiment, the dielectric material has a nitrogen level comprised between 20% and 50%. As an example, the dielectric material is selected from among silicon nitrides ($Si_xN_y$; all stoichiometries are possible), silicon carbonitride (SiCN) and silicon boron carbonitride (SiBCN).

The sacrificial layer 11 is for example formed by PECVD (plasma enhanced chemical vapour deposition).

The following step S12, represented by FIG. 1B, consists in exposing the surface of the sacrificial layer 11 to an etching plasma so as to generate asperities 12. The asperities 12 are projecting patterns having a random shape and distributed in a non-uniform manner on the surface of the sacrificial layer 11. These patterns are obtained by partially etching the sacrificial layer 11, by a micro-masking effect (deposition of a part of the ions of the plasma in the form of a polymer layer of variable thickness and simultaneous etching of the dielectric layer and the polymer layer, the dielectric layer and the polymer layer having different etching speeds).

The formation of asperities 12 has the effect of increasing the surface roughness of the sacrificial layer 11, going for example from an initial value of the order of 1 nm to a final value greater than or equal to 10 nm, and, in an embodiment, comprised between 10 nm and 30 nm (terminals included).

Step S12 of exposure of the sacrificial layer 11 is, in an embodiment, accomplished in a reactive ion etching reactor, for example with inductively coupled plasma (ICP). The reactor notably comprises a chamber in which the etching plasma is generated, a radiofrequency (RF) antenna called "source generator" and a substrate holder called "bias generator", on which is arranged the substrate (covered with the metal layer 10 and the sacrificial layer 11). The substrate holder makes it possible to apply an RF bias to the substrate.

The etching plasma is formed from a mixture of reactive gases introduced into the chamber of the reactor. The mixture of reactive gases, in an embodiment, comprises a gas containing oxygen, a gas containing silicon and fluorine or silicon and chlorine and a fluorocarbon gas ($C_xF_y$), which may be hydrogenated ($C_xH_yF_z$). A neutral, so-called dilution gas, such as argon or helium, may also be introduced into the chamber of the reactor in order to make the plasma less reactive, while increasing the physical aspect of the etching (bombardment).

The ratio of the flow rate of gas containing oxygen over the flow rate of gas containing silicon and fluorine or chlorine is, in an embodiment, comprised between 20 and 50. The ratio of the flow rate of hydrogenated fluorocarbon gas over the flow rate of gas containing oxygen is, in an embodiment, comprised between 0.9 and 1.1.

As an example, the reactive gas containing oxygen is dioxygen ($O_2$), the reactive gas containing silicon and fluorine or chlorine is silicon tetrachloride ($SiCl_4$) or silicon tetrafluoride ($SiF_4$) and the reactive hydrogenated fluorocarbon gas is fluoromethane ($CH_3F$).

Generally speaking, the more nitrogen the dielectric material of the sacrificial layer 11 contains, the more the mixture of reactive gases can contain oxygen (by increasing for example the $O_2$ flow rate/$SiCl_4$ or $SiF_4$ flow rate ratio).

In a particular embodiment of the roughening method, the dielectric material is a silicon nitride ($Si_xN_y$), such as stoichiometric silicon nitride $Si_3N_4$, and the etching plasma is generated in the following conditions;
- a flow rate of $SiCl_4$ or $SiF_4$ comprised between 2 sccm and 5 sccm (abbreviation of "Standard Cubic Centimetres per Minute", i.e. the number of $cm^3$ of gas flowing per minute in standard pressure and temperature conditions, i.e. at a temperature of 0° C. and a pressure of 1013.25 hPa);
- a flow rate of $O_2$ comprised between 40 sccm and 250 sccm;
- a flow rate of $CH_3F$ comprised between 40 sccm and 250 sccm;
- a power emitted by the source of the reactor comprised between 100 W and 1000 W;
- a bias voltage of the substrate comprised between −200 V and −500 V;
- a pressure in the chamber of the reactor comprised between 6.666 Pa (50 mTorr) and 19.998 Pa (150 mTorr);
- a temperature of substrate holder comprised between 20° C. and 100° C.; and
- a temperature of the walls of the chamber of the reactor comprised between 50° C. and 80° C.

For example, the flow rate of $SiCl_4$ or $SiF_4$ is 5 sccm, the flow rate of oxygen is 200 sccm, the flow rate of $CH_3F$ is 200 sccm, the source power is 400 W, the bias voltage of the substrate is −250 V, the pressure in the chamber of the reactor is 11.999 Pa (90 mTorr), the temperature of the substrate is 50° C. and helium is further introduced into the reactor (flow rate: 120 sccm).

The exposure time of the sacrificial layer 11 to the etching plasma is determined as a function of the surface roughness that it is wished to obtain at the end of step S12. For the parameter ranges described previously, it is typically comprised between 30 s and 300 s.

The initial thickness (i.e., before etching) of the sacrificial layer 11 is beneficially greater than or equal to the desired surface roughness (in root mean square value).

At the end of the exposure step S12, the sacrificial layer 11 may still entirely cover the metal layer 10, as is illustrated by FIG. 1B, Alternatively, a part of the metal layer 10 may have been uncovered.

At step S13 of FIG. 1C, the metal layer 10 is etched through the sacrificial layer 11 so as to transfer the asperities 12 of the sacrificial layer 11 into a part at least of the metal layer 10. In other words, the sacrificial layer 11 is used as a hard mask for etching the metal layer 10.

When the sacrificial layer 11 entirely covers the metal layer 10, the sacrificial layer 11 is firstly consumed until leading into a part of the metal layer 10, then portions of the metal layer 10 are etched at the same time as the sacrificial layer 11. The etching of the metal layer 10 thus does not start at the same instant according to the regions of the surface of the metal layer 10, which leads to the formation of surface asperities. Portions of the metal layer 10 may be not etched if the hard mask formed by the sacrificial layer 11 is sufficiently thick above these portions or if the etching time is limited. These portions are then covered by residues 11' of the sacrificial layer 11 at the end of the transfer step S13, as represented by FIG. 1C.

The etching of the metal layer 10 may be accomplished by means of any technique known to those skilled in the art: reactive ion etching (RIE), ion beam etching (IBE), etc. The metal layer 10 may be etched at the transfer step S13 by means of an etching method that is not very selective with respect to the sacrificial layer 11 that is to say having a selectivity comprised between 1 and 2 (terminals included). In this case, the asperities 12 of the sacrificial layer 11 are transferred into the metal layer 10 substantially identically. Ion beam etching is an example of non-selective method (selectivity equal to 1) and the reactive ion etching with a chlorine or fluorine based plasma is an example of not very selective method (selectivity less than or equal to 2).

Conversely, by using an etching method having a selectivity strictly greater than 2, the size of the asperities 12 is increased during the transfer of the sacrificial layer 11 to the metal layer 10.

Thus, the final roughness of the metal layer 10 may be modulated by playing on the selectivity of the method of etching the metal layer.

A benefit of the roughening method of FIGS. 1A-1C is to be able to use the same dielectric material to form the sacrificial layer 11, whatever the material of the underlying metal layer 10, and thus to only have a single plasma etching recipe (instead of having as many recipes as metals). The roughening method is applicable to all metals, given that all etching techniques known to those skilled in the art (for etching a metal layer) may be used to transfer the roughness from the sacrificial layer 11 to the metal layer 10.

For example, the etching of the metals Ti, Ta, TaN, AlCu and AlSi is possible by RIE by using a chlorine or fluorine based chemistry, whereas the etching of noble metals such as Pt, Au and Ru is accomplished by IBE. Ion beam etching being by nature non-selective with respect to the dielectric material, the asperities are transferred substantially identically into a noble metal layer.

Figure 1D:
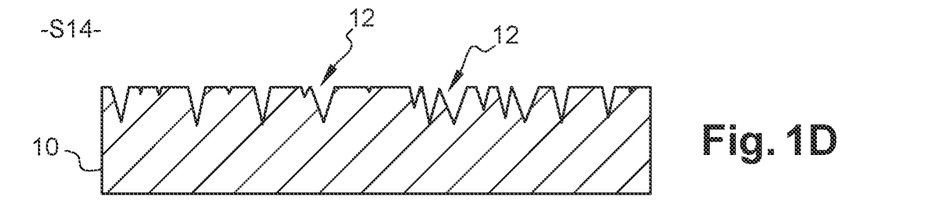

FIG. 1D represents an additional step S14 of the roughening method, being able to be accomplished after step S13 of FIG. 1C. When the sacrificial layer 11 is not completely consumed at the end of the transfer step S13, the sacrificial layer 11 may be removed selectively with respect to the metal layer 10. This step S14 of selective removal is beneficially accomplished by wet etching, for example by means of a hydrofluoric acid (HF) solution.

Two examples of application of the roughening method will now be described in relation with FIGS. 2A-2C and FIGS. 3A-3C.

The first example of application relates to a method for manufacturing a resistive random access memory cell, for example of OxRAM type. A resistive random access memory cell conventionally comprises a first electrode called lower electrode, a second electrode called upper electrode, and a resistive layer (also called active layer) arranged between the lower and upper electrodes. The resistive layer is formed of a material with variable electrical resistance, an oxide in the case of an OxRAM cell.

Figure 2A:
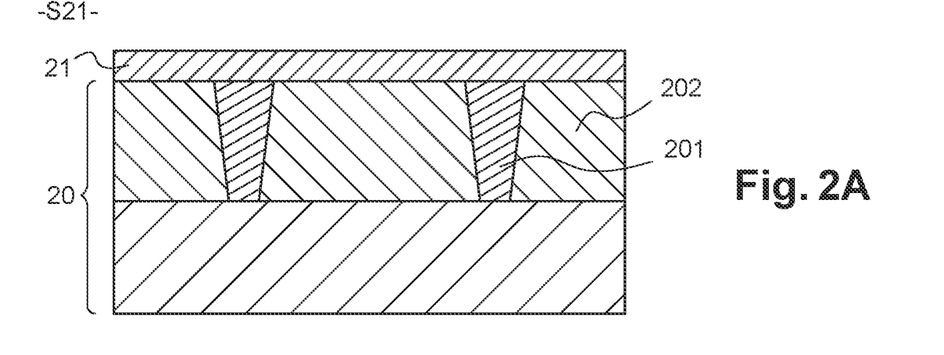
FIG. 2A, FIG. 2B and FIG. 2C represent the steps of a method for manufacturing a resistive random access memory cell, wherein the method of FIGS. 1A-1D is implemented.
Figure 2B:
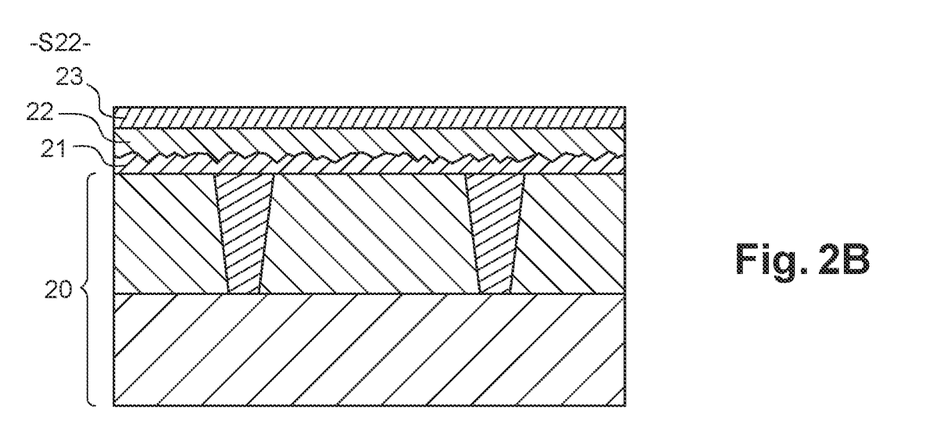
Figure 2C:
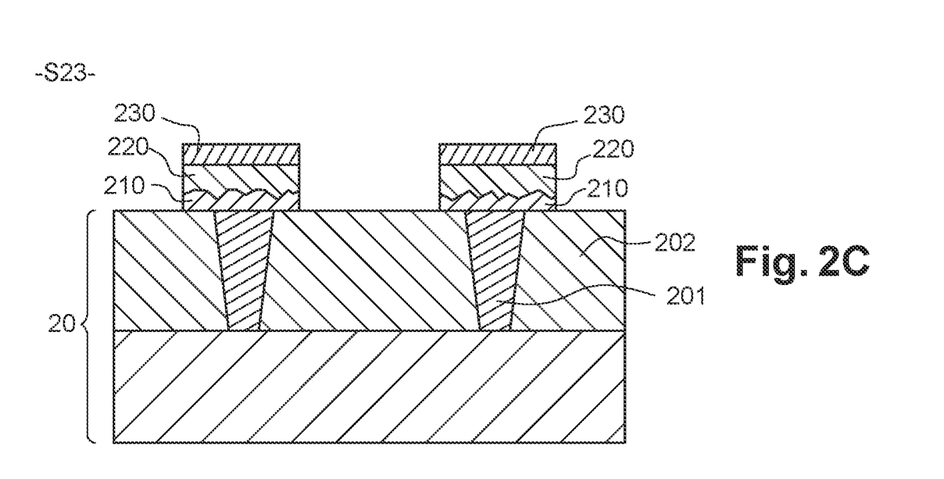

FIGS. 2A to 2C schematically represent steps S21 to S23 of this method for manufacturing a resistive random access memory cell.

Step S21 of FIG. 2A consists in depositing a first metal layer 21 on a substrate 20. For example, the first metal layer 21 is formed of titanium nitride (TiN) and its thickness is comprised between 100 nm and 150 nm.

The substrate 20 may notably comprise active components (e.g. transistors), connected together by one or more interconnection levels (or metal levels) to form a CMOS logic circuit (typically a reading circuit). Each interconnection level comprises metal vias and/or metal lines 201 embedded in one or more dielectric layers 202.

The first metal layer 21 is deposited on an interconnection level (for example the first metal level M1) so as to be in contact with the metal lines 201 of this level. Thus, in this example, the memory cell is formed within the BEOL (Back End Of Line) functional block of a CMOS circuit.

The surface roughness of the first metal layer 21 is next increased by means of the roughening method described in relation with FIGS. 1A-1C (and 1D, if appropriate). The final surface roughness of the first metal layer 21 is beneficially greater than or equal to 2 nm, and in an embodiment comprised between 3 nm and 15 nm, in order to decrease in a significant manner the forming voltage of the memory cell.

At step S22 of FIG. 2B, a layer of material with variable electrical resistance 22 is next deposited on the first metal layer 21, then a second metal layer 23 is deposited on the layer of material with variable electrical resistance 22. The material with variable electrical resistance may be an oxide, and in an embodiment, a transition metal oxide such as hafnium oxide ($HfO_2$). The second metal layer 22 is for example formed of titanium nitride (TiN). The thickness of the layer of material with variable electrical resistance 22 may be comprised between 5 nm and 20 nm and the thickness of the second metal layer 22 comprised between 100 nm and 150 nm.

Finally, at step S23 of FIG. 2C, the first metal layer 21, the layer of material with variable electrical resistance 22 and the second metal layer 23 are etched in such a way as to delimit respectively the lower electrode 210, the resistive layer 220 and the upper electrode 230 of the resistive random access memory cell. The etching may be carried out by RIE through a hard mask or resin formed by photolithography and removed after the etching. The etching of the lower electrode (e.g. TiN) by RIE may be selective with respect to the dielectric layer 202 (e.g. $SiO_2$) of the interconnection level, such that there is no transfer of roughness into this dielectric layer 202.

Several memory cells (each comprising a lower electrode 210—resistive layer 220—upper electrode 230 stack) may be formed simultaneously at the etching step S3, as is illustrated by FIG. 2C. The lower electrode 210 of each memory cell is in contact with a metal line 201 of the interconnection level.

A second example of application of the roughening method relates to a method for forming a via with random electrical resistance.

Figure 3A:
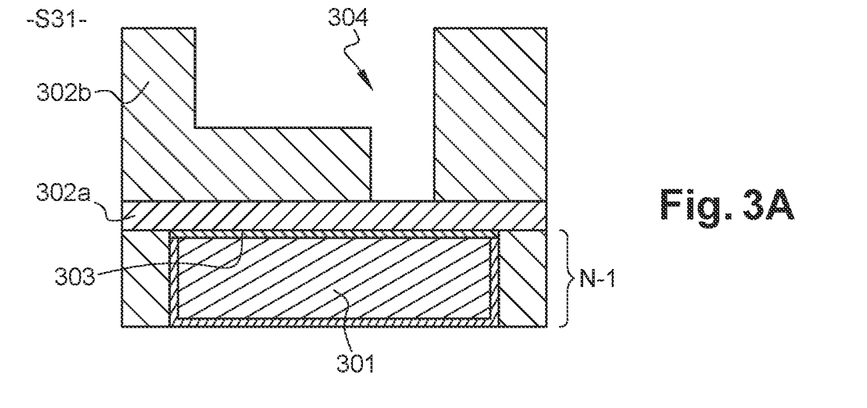
FIG. 3A, FIG. 3B and FIG. 3C represent the steps of a method for forming a via, wherein the method of FIGS. 1A-1D is implemented.
Figure 3B:
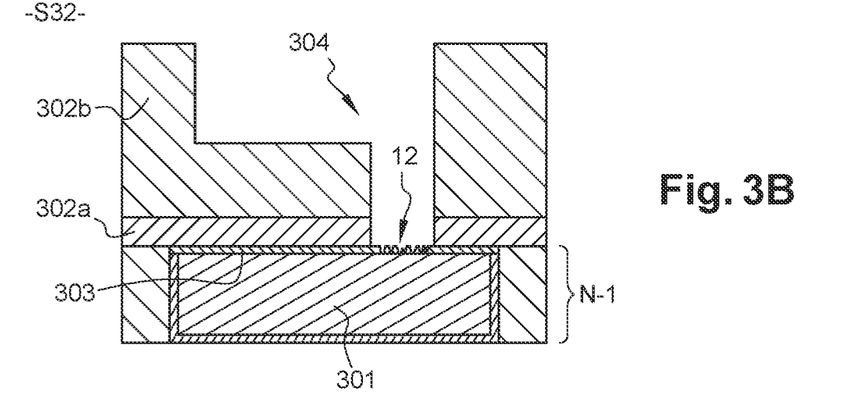
Figure 3C:
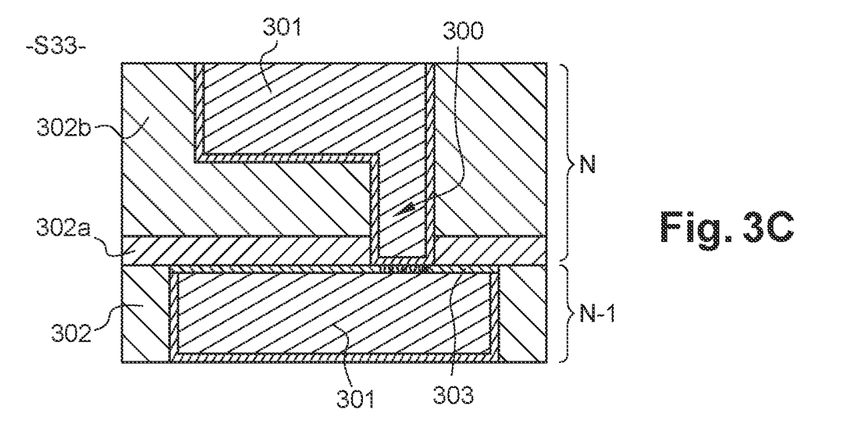

With reference to FIG. 3C, a via 300 is a metal pad electrically connecting two metal lines 301 belonging to two consecutive interconnection levels (that is to say two metal levels) of an integrated circuit. These two interconnection levels are hereafter called levels N and N-1. The metal line 301 of level N-1 (like optionally that of level N) may be covered with a barrier layer 303, preventing the diffusion of the metal line into the dielectric layer or layers 302a-302b of the upper interconnection levels, in particular those of level N. This diffusion barrier 303 may be made of metal, for example made of alloy of cobalt and tungsten doped with phosphorous (CoWP) or with boron (CoWB), and self-aligned on the metal line 301 (selective deposition, uniquely localised on the metal line).

The via 300 extends from the metal line 301 of the level at N up to the metal barrier layer 303 covering the metal line 301 of the level N-1. Its electrical resistance depends notably on the surface state of the metal barrier layer 303.

The roughening method is applied in this context to increase the roughness of the metal barrier layer 303, in order to confer on the via 300 a random electrical resistance. Vias with random electrical resistance make it possible to construct an integrated circuit provided with a physical unclonable function (PUF). A physical unclonable function is a digital signature or fingerprint, unique and non-falsifiable, which serves to identify the integrated circuit. Such an integrated circuit finds numerous applications in cryptography.

FIGS. 3A to 3C schematically represent steps S31 to S33 of the method for forming a via 300 having a random electrical resistance.

At step S31 of FIG. 3A, a first dielectric layer 302a is deposited on the metal barrier layer 303, then a second dielectric layer 302b is deposited on the first dielectric layer 302a.

The first dielectric layer 302a is intended to serve as sacrificial layer (or hard mask layer) during the method for roughening the metal barrier layer 303. It is thus comprised of a dielectric material comprising nitrogen, for example $Si_3N_4$ or SiCN.

The second dielectric layer 302b is, in an embodiment, formed of a dielectric material having a low dielectric constant (also called low-k dielectric material). As an example, the second dielectric layer 302b is made of SiOC.

Then, the second dielectric layer 302b is etched so as to form a cavity 304, the first dielectric layer 302a beneficially serving as stop layer to the etching of the second dielectric layer 302b. The cavity 304 leads into the first dielectric layer 302a (in other words, the bottom of the cavity 304 is formed by the first dielectric layer 302a). The cavity 304 may be shaped in such a way as to produce simultaneously the via and the metal line of level N, conforming to a conventional "dual damascene" integration method.

Step S32 of FIG. 3B comprises steps S12, S13 and optionally S14 of the roughening method. These are accomplished in the manner described in relation with FIGS. 1B, 1C and 1D.

A surface of the first dielectric layer 302a, situated at the bottom of the cavity 304, is exposed to an etching plasma (for example CH$_3$F/SiCl$_4$/O$_2$) so as to create asperities (step S12).

Then, the metal barrier layer 303 is etched through the first dielectric layer 302a, so as to transfer the asperities of the first dielectric layer 202a into the metal barrier layer 303 (step S13). The etching of the metal barrier layer 303 may partially lead into the metal line 301 of level N−1. An etching method having a selectivity (with respect to the first dielectric layer 302a) comprised between 1 and 2 may be favoured to have better control, and notably to avoid too deep etching of the metal line 301.

The possible residues of the first dielectric layer 302a are next etched selectively with respect to the underlying metal layers (step S14).

Finally, at step S33 of FIG. 3C, the cavity 304 is filled with one or more metals in order to form the via 300 and, desirably simultaneously, the metal layer 301 of level N. Step S33 may comprise successively the deposition of a metal diffusion barrier (for example made of Ta/TaN) on the walls of the cavity 304, the deposition of a seed layer (typically made of copper) on the metal diffusion barrier and the filling of the remainder of the cavity with a metal (typically copper) by electrochemical deposition.

The random roughness of the metal barrier layer 303 at the level of the via 300, as well as its more or less pronounced opening on the metal line 301 of level N−1, confers on the via 300 a random electrical resistance that can be measured by a reading circuit.

The roughening method of FIGS. 1A-1D is here integrated in a method of simultaneous formation of a via and a metal line (dual damascene method). However, it may also be integrated in a method for forming a via only (single damascene method).

The invention claimed is:

1. A method for increasing the surface roughness of a metal layer, comprising:
    depositing on the metal layer a sacrificial layer made of a dielectric material comprising nitrogen;
    exposing a surface of the sacrificial layer to an etching plasma so as to create asperities, and
    etching the metal layer through the sacrificial layer, so as to transfer the asperities of the sacrificial layer into a part at least of the metal layer.

2. The method according to claim 1, wherein the asperities are projecting patterns having a random shape and distributed in a non-uniform manner on the surface of the sacrificial layer.

3. The method according to claim 1, wherein the asperities are obtained by partially etching the sacrificial layer, by a micro-masking effect.

4. The method according to claim 1, wherein the dielectric material comprising nitrogen is selected from among silicon nitrides (Si$_x$N$_y$), silicon carbonitride (SiCN) and silicon boron carbonitride (SiBCN).

5. The method according to claim 1, wherein the etching plasma is formed from a mixture of reactive gases comprising a gas containing oxygen, a gas containing silicon and fluorine or silicon and chlorine and a fluorocarbon gas (C$_x$F$_y$), optionally hydrogenated (C$_x$H$_y$F$_z$).

6. The method according to claim 5, wherein the gas containing oxygen is O$_2$, the gas containing silicon and fluorine or silicon and chlorine is SiCl$_4$ or SiF$_4$ and the hydrogenated fluorocarbon gas is CH$_3$F.

7. The method according to claim 1, wherein the dielectric material is a silicon nitride (Si$_x$N$_y$) and wherein the etching plasma is generated in a chamber of a reactive ion etching reactor in the following conditions:
    a flow rate of SiCl$_4$ or SiF$_4$ entering into the chamber of the reactor comprised between 2 sccm and 5 sccm;
    a flow rate of O$_2$ entering into the chamber of the reactor comprised between 40 sccm and 250 sccm;
    a flow rate of CH$_3$F entering into the chamber of the reactor comprised between 40 sccm and 250 sccm;
    a power emitted by a source of the reactor comprised between 100 W and 1000 W;
    a bias voltage comprised between −200 V and −500 V;
    a pressure in the chamber of the reactor comprised between 6.666 Pa and 19.998 Pa;
    a temperature of substrate holder comprised between 20° C. and 100° C.;
    a temperature of the walls of the chamber of the reactor comprised between 50° C. and 80° C.

8. The method according to claim 1, further comprising, after the etching of the metal layer, selectively removing the sacrificial layer.

9. The method according to claim 1, wherein the sacrificial layer is entirely consumed during the step of etching of the metal layer.

10. The method according to claim 1, wherein the sacrificial layer has, after the exposing of the surface of the sacrificial layer to the etching plasma, a surface roughness, expressed in root mean square value, greater than or equal to 10 nm.

11. The method according to claim 10, wherein the surface roughness is comprised between 10 nm and 30 nm.

12. The method according to claim 1, wherein the metal layer initially has a surface roughness, expressed in root mean square value, strictly less than 1 nm.

13. The method according to claim 1, wherein the metal layer is etched by means of an etching method having a selectivity with respect to the sacrificial layer comprised between 1 and 2.

14. The method according to claim 1, wherein the metal layer is etched by means of an etching method having a selectivity with respect to the sacrificial layer strictly greater than 2.

15. A method for manufacturing a resistive random access memory cell comprising a first electrode, a second electrode and a resistive layer arranged between the first and second electrodes, the method comprising:
    depositing a first metal layer on a substrate;
    increasing the roughness of the first metal layer by means of a method according to claim 1;
    depositing a layer of material with variable electrical resistance on the first metal layer and a second metal layer on the layer of material with variable electrical resistance, and
    etching the first metal layer, the layer of material with variable electrical resistance and the second metal layer, so as to delimit respectively the first electrode, the resistive layer and the second electrode of the resistive random access memory cell.

16. A method for forming a via extending up to a metal barrier layer, the method comprising:
    depositing a first dielectric layer on the metal barrier layer, the first dielectric layer being comprised of a material comprising nitrogen;
    depositing a second dielectric layer on the first dielectric layer;
    forming in the second dielectric layer a cavity leading into the first dielectric layer;

exposing at the bottom of the cavity a surface of the first dielectric layer to an etching plasma so as to create asperities;

etching the metal barrier layer through the first dielectric layer, so as to transfer the asperities of the first dielectric layer into a part at least of the metal barrier layer, and filling the cavity with at least one metal.

* * * * *

UNITED STATES PATENT AND TRADEMARK OFFICE
CERTIFICATE OF CORRECTION

| | | |
|---|---|---|
| PATENT NO. | : 12,094,722 B2 | Page 1 of 1 |
| APPLICATION NO. | : 17/535777 | |
| DATED | : September 17, 2024 | |
| INVENTOR(S) | : Olivier Pollet et al. | |

It is certified that error appears in the above-identified patent and that said Letters Patent is hereby corrected as shown below:

On the Title Page

Item (30) Foreign Application Priority Data, is missing. It should read:
(30) Foreign Application Priority Data
Nov. 27, 2020 (FR)................. 2012280

Signed and Sealed this
Tenth Day of December, 2024

Katherine Kelly Vidal
*Director of the United States Patent and Trademark Office*